May 3, 1932.  H. A. HADLEY  1,856,704
WEIGHING SCALE
Filed Dec. 3, 1928   2 Sheets-Sheet 1
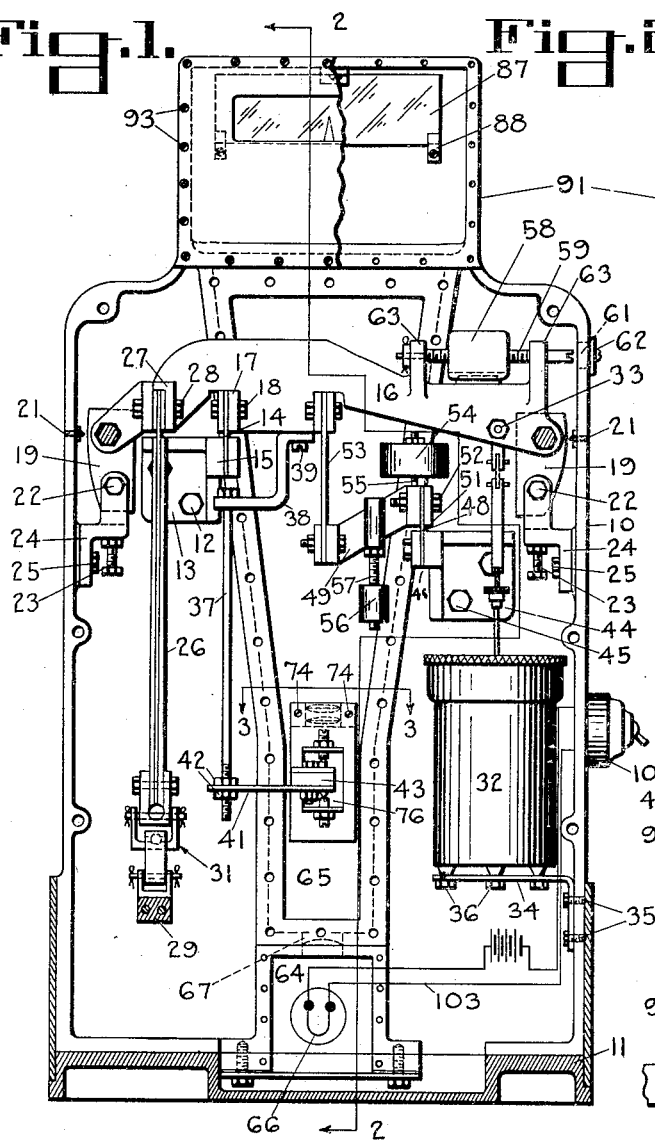
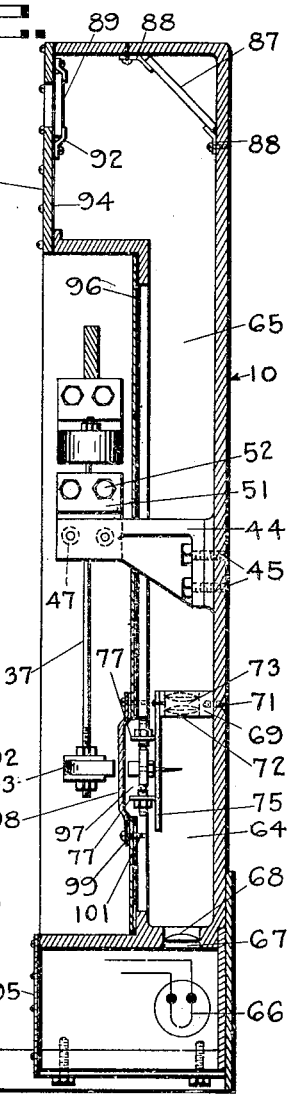
Fig.1. Fig.2. Fig.3. Fig.4.
INVENTOR
HARLAN A. HADLEY
BY
Henry Sherman
ATTORNEY May 3, 1932.　　　H. A. HADLEY　　　1,856,704
WEIGHING SCALE
Filed Dec. 3, 1928　　2 Sheets-Sheet 2

INVENTOR
HARLAN A. HADLEY
BY
ATTORNEY

Patented May 3, 1932

1,856,704

UNITED STATES PATENT OFFICE

HARLAN A. HADLEY, OF ST. JOHNSBURY, VERMONT, ASSIGNOR TO E. AND T. FAIRBANKS AND COMPANY, OF ST. JOHNSBURY, VERMONT, A CORPORATION OF VERMONT

WEIGHING SCALE

Application filed December 3, 1928. Serial No. 323,418.

This invention relates to weighing scales of the type in which the deflection of the beam is magnified and projected in enlarged form upon a suitable screen by suitable optical means. While devices of this type may be applied to scales used for many different purposes, I have shown my invention applied to a predetermined weight, or precision, scale, it being understood that it is by no means limited to use with scales for accomplishing this result and that I contemplate its use wherever applicable.

In scales of the class referred to, as heretofore commonly constructed, no provision was made for keeping the scale free from dust, powder and the like to which the scales were exposed when employed in certain surroundings. The disadvantage of this construction, and one which tended to lower considerably the efficiency of these scales, resided in the lowered visibility which obtained when the particles of dust or powder settled on the screen, lamp, reflector and lenses. This defect in construction was especially manifest when the scale was employed for the purpose of weighing the several ingredients that enter into a rubber mixture, or compound. These ingredients, which include sulphur, diatomaceous earth, clay and soapstone, are in a finely powdered state. The atmosphere in the room in which the weighing operations take place is heavily laden with particles of these powders which accumulate on the scale parts to such a degree that it is necessary to halt the weighing and compounding operations until the scale parts are cleaned. As this cleaning must take place quite often, it is readily apparent that an economic loss is sustained. It is therefore an object of this invention to provide an improved weighing scale which will be free from the abovementioned and other disadvantages and which will be especially simple in construction and efficient in operation.

Another object of this invention is to provide improved means for housing certain parts of the scale for the purpose of preventing the particles of dust or powder from reaching them. In the illustrative construction, this means comprises adjoining hermetically sealed compartments.

Another object of this invention is the provision of improved means for actuating the indicator, the construction and arrangement being preferably such that the indicator is moved by an actuating element which has no mechanical connection therewith.

Other objects of this invention, together with certain details of construction and combination of parts, will be described in the specification and pointed out in the appended claims.

In the drawings:

Figure 1 is a front elevational view with the coverplate, platform and lever system removed;

Figure 2 is vertical cross-sectional view taken on line 2—2 in Figure 1 with all the cover plates in position;

Figure 3 is a horizontal cross-sectional view taken on line 3—3 in Figure 1;

Figure 4 is a side elevation of a modified indicator construction showing a dampening means for the same;

Similar characters of reference designate corresponding parts throughout the several views of the drawings.

Figure 5:
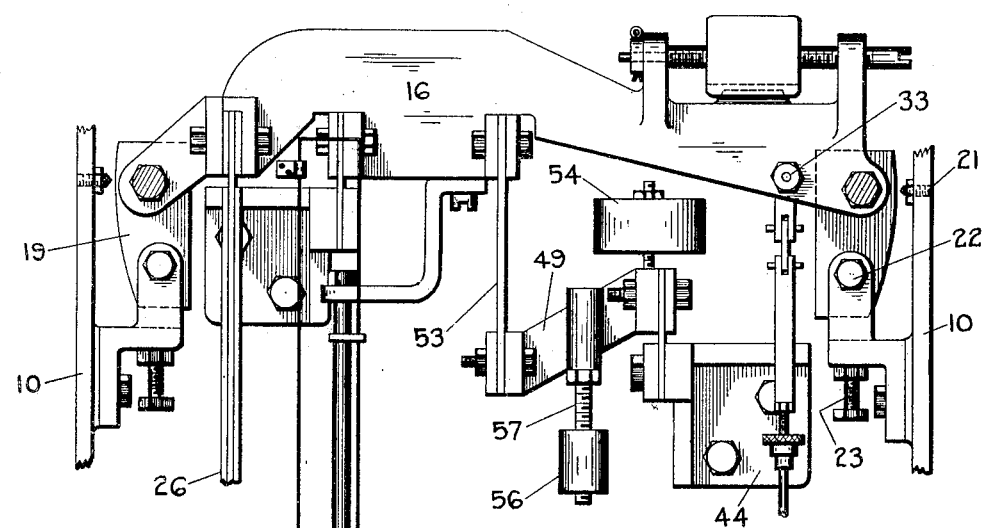
Figure 5 is a front elevation of the beam and weight offsetting construction showing a modified form of indicator actuating unit.

Referring to the drawings there is shown a housing generally indicated by the reference numeral 10 which is preferably an aluminum casting. This housing is secured in any suitable manner to a horizontal base 11 in which is housed the lever and suspension systems (not shown). The latter form the subject matter of the co-pending application of Alfred Bousfield, Serial No. 298,989, filed August 11, 1928.

Secured to the rear wall of the scale housing by means of screws 12 is a bracket 13 to which a length of flexible steel ribbon 14 is clamped by a clip 15. The ribbon 14 functions as a fulcrum for a beam 16 which is rigidly secured to the upper extremity of said ribbon by a clip 17 and bolts 18. To the ends of the beam are attached stop plates 19 which cooperate with adjustable stops 21 to limit the endwise movement of the beam. Stops 22 restrict the lateral movement of the beam, and stops 23 the vertical movement thereof. The stops 22 and 23 are disposed in bracket members 24 fixed to the side walls of the housing by cap screws 25.

The load is transmitted from the lever system to the beam through a flexibly mounted steelyard rod 26 which is connected at its upper end to the beam by means of a clamp 27 and bolts 28, and at its lower end to the long, or extension, lever 29 through the medium of a self-aligning connection 31. For the purpose of dampening the oscillations of the beam a dashpot 32 is suitably connected to the beam at 33. A shelf 34 fastened to the side wall of the housing by screws 35 supports the dashpot. Screws 36 are employed to retain the dashpot on the shelf and are also adapted to adjust the plane of the base thereof.

The main pendulum arm 37 is rigidly secured to an offset bracket 38 which is attached to the beam by a screw 39. The pendulum arm carries at its lower extremity a vertically adjustable bracket 41. The lock nuts 42 retain the bracket in adjusted position. The free end of the bracket 41 carries the permanent magnet 43 preferably having the form of a horseshoe.

A second bracket 44 is suitably secured to the rear wall of the housing by cap screws 45 and has clamped thereto by means of a clip 46 and cap screw 47 the flexible steel ribbon 48 on which is fulcrumed the auxiliary pendulum lever 49 rigidly fastened to the ribbon by a clip 51 securely held by bolt 52. The auxiliary lever is connected to the beam, or main lever, 16 through the flexible ribbon 53. The auxiliary pendulum weight 54 is adjustably mounted on the screw-threaded pendulum rod 55 suitably fixed to the auxiliary lever. The gravity weight 56 is adjustably carried on the screw-threaded stem 57 fixed to the auxiliary lever. To balance the scale at its zero point, there is mounted on the main lever the balance weight 58 adjustable along the screw-threaded stem 59 which is accessible through the opening 61 in the scale housing. The opening is normally closed by the cover plate 62. The threaded stem 59 is journaled in a pair of uprights 63 integral with the beam 16.

Formed within the scale housing are two compartments 64 and 65, the walls of which are cast integral with the housing. Referring to Figure 2 of the drawings, it will be seen that the lower compartment 64 is rectangular in cross-section and the upper compartment in vertical cross-section has the form of an inverted L. The source of light 66 which is preferably an electric light is suitably mounted in the chamber 64. In the wall which separates the two compartments and directly above the light 66 is formed a substantially circular aperture 67 in which is suitably secured the condensing lens 68. It will be noted that the walls of the compartment 65 diverge upwardly to provide an unobstructed path for the light rays.

The bracket 69 is fastened to the rear wall of the chamber 65 by means of the screw 71. The bracket has an aperture 72 formed therein in which aperture is seated the projecting lens 73. Secured to the bracket by screws 74 is a depending panel 75 which is apertured at 76 and has a pair of integral lugs 77 formed at right angles thereto. The lugs 77 have screw-threaded openings 78 formed therein, in which openings are adjustably mounted conical, or cupped, bearings 79. A vertical spindle 81, pointed at each end, has its points received in the bearings 79. Mounted on the spindle 81 is a horizontally disposed pointer, or indicator, 82 which is placed in the optical axis between the condensing and projecting lenses. The indicator is brought to a fine point at the extremity 83 which projects into the path of the light rays and its other extremity is enlarged to provide a greater effective surface 84 upon which the magnet is adapted to act. The indicator must of course be made from a magnetic substance. Where it is found necessary to prevent excessive vibration of the indicator, there is provided a dampening means comprising a blade 85 depending from the butt end of the indicator, said blade being partially immersed in any suitable liquid, such as oil, water or the like contained in the receptacle 86 which may be attached to a wall of the compartment 65.

The reflecting member 87 is fixed to the walls of the compartment by clips 88 and is arranged at a suitable distance and angle from lens 73 to deflect the image of the indicator substantially at right angles onto a screen 89 of a suitable translucent material. The screen is secured to the cover plate 91 by clips 92. The cover plate 91 is fastened by means of screws 93 over the compartment opening in the upper part of the scale housing, a gasket 94 of any suitable impervious substance being inserted between the cover plate and the walls of the opening to prevent the passage of air, dust, dirt, etc., from entering the compartment 65. The openings in the compartments 64 and 65 contained within the housing 10 are covered in a similar manner by cover plates 95 and 96, respectively. To make the indicator mechanism more easily accessible the cover plate 96 is apertured at 97. This aperture is also closed by a plate 98 and an impervious packing 99 which are held in position by screws 101.

Located on the side wall of the housing is a switch 102 in the line 103 which leads to the light 66.

Figure 6:
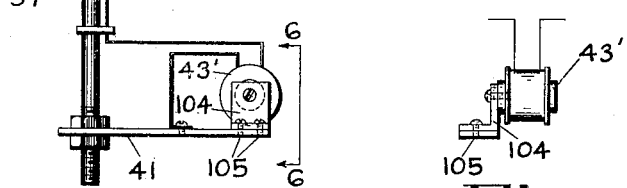
Figure 6 is a detail view taken on line 6—6 in Figure 5.
Figure 7:
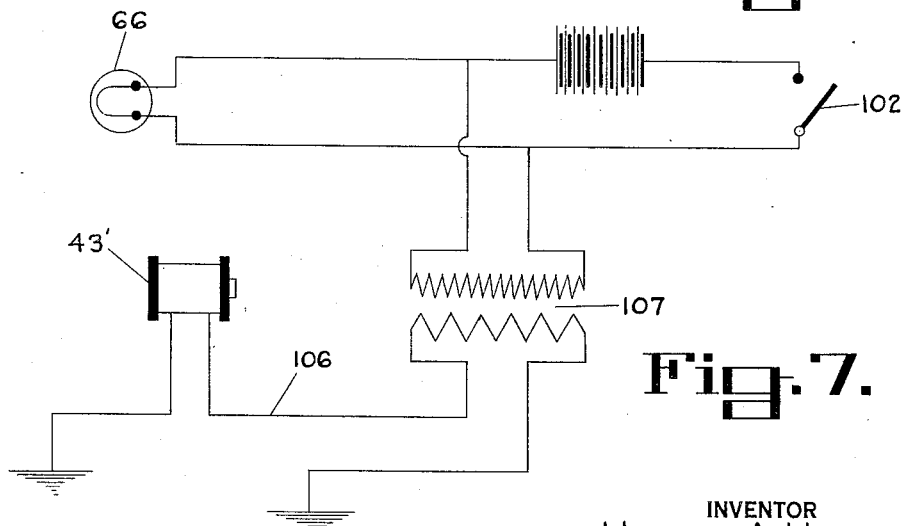
Figure 7 is a diagrammatic view of the circuit connections for the modification shown in Figure 5.

Referring to the embodiment shown in Figures 5 and 6, the bracket 41 carries the electromagnet 43' secured to said bracket by an angle 104 and screws 105. The lead wire 106 connects the electromagnet to the light circuit through the transformer 107 which steps the current down to the voltage required to operate the electromagnet. It will be understood that when the switch 102 is thrown the light and the electromagnet are simultaneously energized.

Having thus described my invention, what I claim as new and desire to secure by Letters Patent of the United States is:

1. In a scale of the class described, the combination with indicating mechanism including magnetic, pendulated means for actuating the said indicating mechanism in accordance with the load on the scale.

2. In a scale of the class described, the combination with indicating mechanism including means for actuating the said indicating mechanism in accordance with the load on the scale, said means including a pendulated magnet.

3. In a scale of the class described, the combination with indicating mechanism including a pointer, of magnetic means for moving said pointer in accordance with the load on the scale and means cooperating with said pointer to dampen the oscillations thereof.

4. In a scale of the class described, a pendulum adapted to be actuated by the load on the scale, magnetic means carried by said pendulum and a pointer movable by said magnetic means.

5. In a scale of the class described, a beam adapted to be actuated by the load on the scale, a pendulum mounted on said beam, magnetic means carried by said pendulum and a pointer movable by said magnetic means.

6. In a scale of the class described, in combination, hermetically sealed indicating mechanism and magnetic, pendulated means for actuating said mechanism.

7. In a scale of the class described, a housing having an hermetically sealed compartment therein and a pointer mounted in said compartment actuated by magnetic, pendulated means.

8. In a scale of the class described, a housing having an hermetically sealed compartment therein and a pointer pivotally mounted in said compartment actuated by magnetic, pendulated means.

9. The combination with a part of a scale movable in accordance with the weight on the scale, of magnetic pendulated means movable thereby in accordance with the load upon the scale, an hermetically sealed compartment and a pointer mounted therein, said pointer being actuated by said magnetic means.

10. The combination with a part of a scale movable in accordance with the weight on the scale, of magnetic means movable thereby in accordance with the load on the scale, an hermetically sealed compartment and a pointer pivotally mounted in said compartment, said pointer being actuated by said magnetic means.

11. The combination with a part of a scale movable in accordance with the weight on the scale, of a pendulum arm movable therewith, magnetic means carried by said arm, an hermetically sealed compartment and a pointer mounted in said compartment, said pointer being actuated by said magnetic means.

12. The combination with a part of a scale movable in accordance with the weight on the scale, of magnetic means movable thereby in accordance with the load on the scale, a pointer actuated by said magnetic means, a screen and means for projecting said pointer onto said screen.

13. The combination with a part of a scale movable in accordance with the weight on the scale, of a pendulum arm movable therewith, magnetic means carried by said arm, a pointer actuated by said magnetic means, a screen and means for projecting said pointer onto said screen.

14. The combination with a part of a scale movable in accordance with the weight on the scale, of magnetic pendulated means movable thereby in accordance with the load on the scale and a pointer spaced from said magnetic means and actuated thereby.

15. The combination with a part of the scale movable in accordance with the weight on the scale, of a pendulum movable thereby, magnetic means carried by said pendulum and a pointer spaced from said magnetic means and actuated by the latter.

16. The combination with a part of a scale movable in accordance with the weight on the scale, of magnetic means movable thereby in accordance with the load on the scale, a pointer actuated by said magnetic means, said pointer being spaced from said means, a screen and means for projecting said pointer onto said screen.

17. The combination with a part of a scale movable in accordance with the weight on the scale, of a pendulum movable therewith, magnetic means carried by said pendulum, a horizontally disposed pointer actuated by said magnetic means, a screen and means for projecting said pointer onto said screen.

18. The combination with a part of a scale movable in accordance with the weight on the scale, of a pendulum movable therewith, magnetic means carried by said pendulum, a pointer mounted for rotation in a horizontal plane, said pointer being rotated by said magnetic means, a screen and means for projecting said pointer onto said screen.

19. In a scale of the class described, in combination, an hermetically sealed compartment having an indicating means mounted therein and magnetic, pendulated means exteriorly of said compartment movable in accordance with the load on the scale for actuating said indicating means.

20. In a scale of the class described, in combination, an hermetically sealed compartment having a pointer mounted therein and magnetic pendulated means exteriorly of said compartment movable in accordance with the load on the scale for actuating said pointer.

HARLAN A. HADLEY.